United States Patent [19]

Sehrt

[11] Patent Number: 5,688,013

[45] Date of Patent: Nov. 18, 1997

[54] HANDLING DEVICE WITH MOVABLE PINS FOR GRIPPING AN OBJECT

[76] Inventor: Friedhelm Sehrt, Riemelsbeck 152, D-45470 Muelheim, Germany

[21] Appl. No.: 446,633

[22] PCT Filed: Nov. 19, 1993

[86] PCT No.: PCT/DE93/01102

§ 371 Date: May 25, 1995

§ 102(e) Date: May 25, 1995

[87] PCT Pub. No.: WO94/12323

PCT Pub. Date: Jun. 9, 1994

[30] Foreign Application Priority Data

Nov. 26, 1992 [DE] Germany ............ 42 39 649.2

[51] Int. Cl.[6] .......................................... B25J 15/12
[52] U.S. Cl. ............... 294/99.1; 294/86.4; 294/902; 294/907; 901/39
[58] Field of Search ............... 294/1.1, 67.22, 294/86.4, 87.1, 88, 99.1, 100, 119.1, 902, 907; 269/265–267; 901/30, 31, 39

[56] References Cited

U.S. PATENT DOCUMENTS

| 2,486,494 | 11/1949 | Rice . | |
|---|---|---|---|
| 3,507,404 | 4/1970 | Pompe | 294/87.1 X |
| 4,047,709 | 9/1977 | Thyberg et al. | 269/266 X |
| 4,752,063 | 6/1988 | Nagy | 269/266 |
| 4,797,248 | 1/1989 | Tsitschdvili | 294/902 X |

FOREIGN PATENT DOCUMENTS

| 335936 | 4/1977 | Austria . | |
|---|---|---|---|
| 0328740 | 8/1989 | European Pat. Off. . | |
| 2221237 | 10/1974 | France . | |
| 1929830 | 12/1969 | Germany . | |
| 1954654 | 5/1971 | Germany . | |
| 2823584 | 12/1979 | Germany . | |
| 147451 | 4/1981 | Germany . | |
| 149298 | 7/1981 | Germany . | |
| 2947933 | 7/1981 | Germany . | |
| 3312609 | 10/1984 | Germany . | |
| 3327060 | 2/1985 | Germany . | |
| 3331093 | 3/1985 | Germany . | |
| 3411125 | 10/1985 | Germany . | |
| 3812155 | 11/1988 | Germany . | |
| 282874 | 9/1990 | Germany . | |
| 876420 | 10/1981 | U.S.S.R. | 294/902 |
| 1215996 | 3/1986 | U.S.S.R. . | |
| 1217656 | 3/1986 | U.S.S.R. . | |
| 1342728 | 10/1987 | U.S.S.R. . | |
| 1373568 | 2/1988 | U.S.S.R. . | |
| 1546405 | 2/1990 | U.S.S.R. | 294/902 |
| 2148239 | 5/1985 | United Kingdom . | |

OTHER PUBLICATIONS

Stefan Hesse: "Greifer–Praxis". Vogel Buchverlag, Würzburg 1991, pp. 136–138.

Knight: "Pick-up Device needs no Power". In: Machinery and Production Engineering, vol. 141, No. 3638, Nov. 1983, Silver End, Witham, GB, p. 55.

Stefan Hesse: "Industrieroboterperpherie". Hüthig Buchverlag Heidelberg, 1990, pp. 244–245.

*Primary Examiner*—Johnny D. Cherry
*Attorney, Agent, or Firm*—Spencer & Frank

[57] ABSTRACT

A handling device for mechanically gripping, holding, moving or otherwise handling objects of any shape having a defined or undefined position, in particular for handling equipment such as industrial robots, consists of a large number of holding pins which are lowered onto the object to be held, are movably mounted in the longitudinal direction in bores of a holding pin guide plate, and are used to clamp the objects. The objects are released once again by pushing back the holding pins by an ejector plate.

31 Claims, 7 Drawing Sheets

HANDLING DEVICE WITH MOVABLE PINS FOR GRIPPING AN OBJECT

BACKGROUND OF THE INVENTION

The invention relates to a handling device for mechanically gripping, holding, moving or otherwise handling objects, particularly for handling apparatuses, e.g. industrial robots.

Gripping and handling objects of arbitrary shape and different materials in a defined or undefined position is a central and difficult objective in handling technology.

A number of mechanical, two- or multi-finger grippers are already known; these grippers involve a considerable outlay for the necessary gripping movement, with many lever, bearing, operating, control and signal elements, and can only grip and handle objects with a defined position and of a very limited shape range.

Also known are, for example, vacuum grippers, which involve a large outlay to generate the vacuum; again, these can only grip and handle objects which are in a defined position and have relatively large, non-porous and smooth surfaces.

Also known are, for example, magnetic grippers, which can only grip and handle objects made of magnetic materials.

All of the known gripper systems have the disadvantage that they were only developed for special objects of a defined position, and can thus only grip and handle them. When a change is made to other objects or a different position of the objects, the known gripper systems must be retrofitted, converted, exchanged or even reconstructed and rebuilt accordingly.

The flexibility required of today's handling systems, including automatic and rapid adaptation to different ranges of parts, is not achieved with the known gripper systems.

SUMMARY OF THE INVENTION

The object of the invention is to grip and handle objects of arbitrary geometry and different materials in a defined or undefined position, individually or simultaneously in groups, with a simple handling device, in which the adaptation to different objects and different positions of the objects is intended to take place automatically.

According to the invention, this object is accomplished by providing a handling device which is characterized in that a holding pin guide plate which is provided with a plurality of bores disposed close together and is connected to a fastening plate is to be moved toward the objects to be gripped, in which bores round or polygonal holding pins which project freely downwardly are guided to be axially displaceable, and have lower ends which are tangential to the object and enter into frictional lockup and, if necessary, positive lockup with the contour regions of the object by means of elastic deformation of the holding pins during the approach, with an ejection plate that can be lowered toward these objects by means of an ejection apparatus being disposed above the holding pin guide plate.

The advantages that can be attained with the invention are, in particular, that, without adjustments and conversions, the described handling device can grip and handle objects of arbitrary shape, made of the same or different materials, individually or several, from a defined or undefined position, even from a pile or from a jumbled arrangement in a container.

The handling device is automatically adapted to the different object shapes. If the handling device has grasped one or a plurality of objects as prescribed for a specific purpose, a switch that actuates, for example, a handling apparatus can be operated automatically.

High flexibility in gripping and handling of objects is achieved with the described handling device, particularly in handling apparatuses, e.g. industrial robots.

This handling device is, however, also useful as a handheld instrument in numerous applications involving the handling of hot, toxic or radioactive objects.

BRIEF DESCRIPTION OF THE DRAWINGS

Embodiments of the invention are illustrated in the following Figures, in which.

DESCRIPTION OF THE PREFERRED EMBODIMENTS

Figure 1:
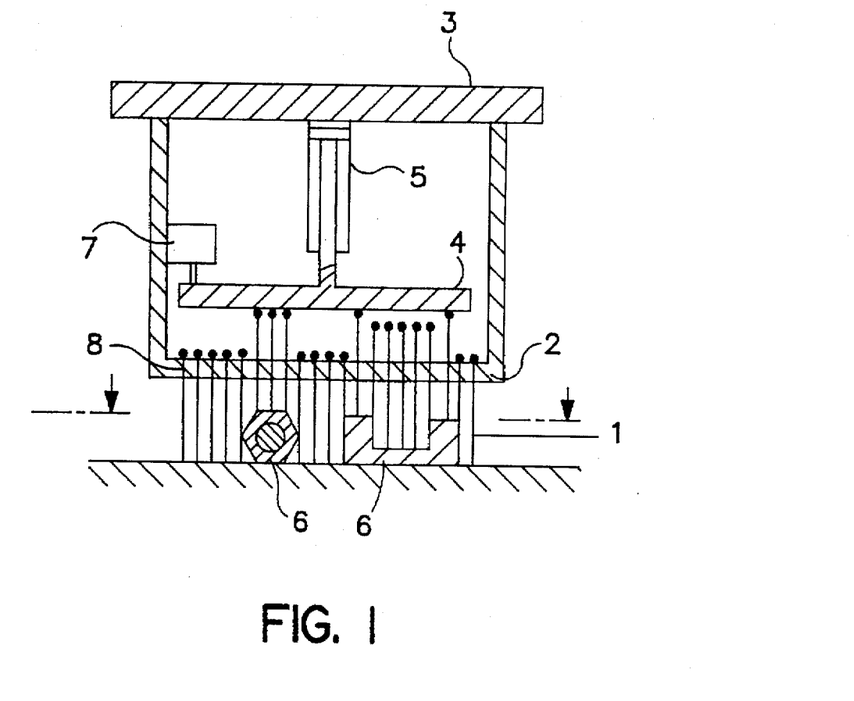
FIG. 1 is a side view (section) of a handling device with objects to be gripped simultaneously.

FIG. 1 shows a side view (section) of the individual elements of a handling device. A holding pin guide plate is connected to a fastening plate 3, which is in turn moved manually or by a handling apparatus, for example an industrial robot. Holding pins 1 are disposed to be axially displaceable in a plurality of bores 8 in the holding pin guide plate 2.

Above the holding pins 1, an ejection plate 4 can be lowered to the holding pins by means of an ejection apparatus 5, not described in detail.

If the fastening plate 3 is moved, with the holding pin guide plate 2, toward the objects 6 to be handled, which are lying on a table, for example, a part of the holding pins 1 is displaced in the bores 8, relative to the holding pin guide plate 2, by the surface of the objects 6, which also causes the ejection plate 4 to be pressed back. Because of this, a switch 7 can be operated which emits the signal to end the lowering movement.

As stipulated by the plurality of holding pins 1, a few holding pins 1 will always be in a favorable position tangential to the surface of the objects 6 such that they yield resiliently and clamp the objects by means of non-positive lockup and/or, in a corresponding embodiment of the holding pins 1, also by means of positive lockup, and hold them for further handling.

The clamped objects 6 are released by pushing of the holding pins 1 back with the ejection plate 4.

Figure 2:
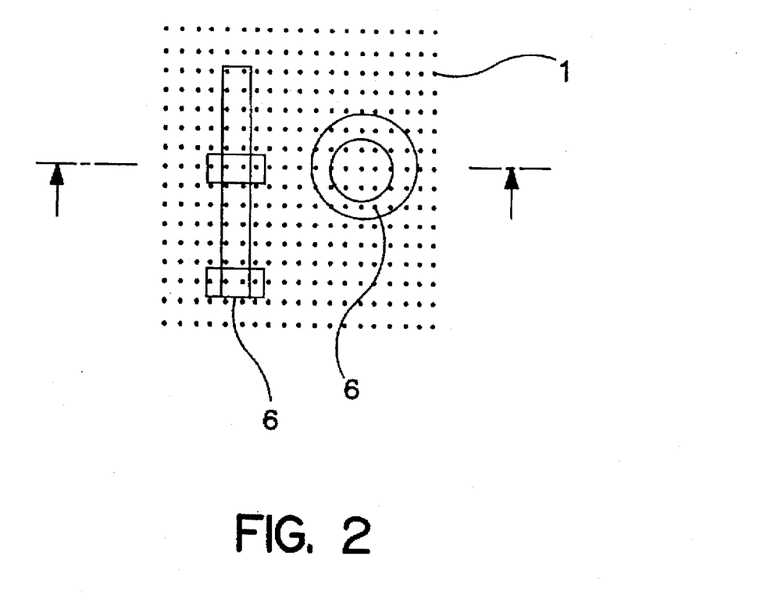
FIG. 2 is a top view (section) of the handling device according to FIG. 1.

FIG. 2 shows a top view (section) of the handling device according to FIG. 1 with two different objects 6 in the clamped position.

Figure 3:
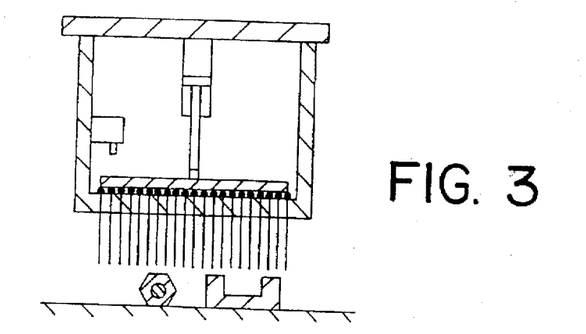
FIG. 3 shows the handling apparatus according to FIG. 1, above the objects.
Figure 4:
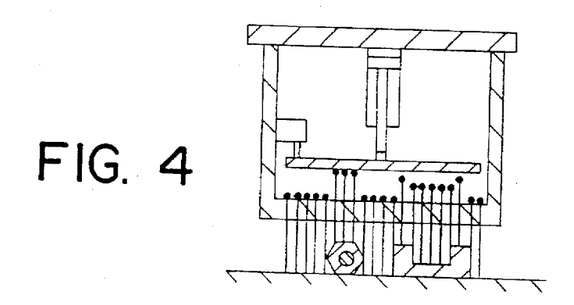
FIG. 4 shows the handling device according to FIG. 1, lowered to the objects to pick them up.
Figure 5:
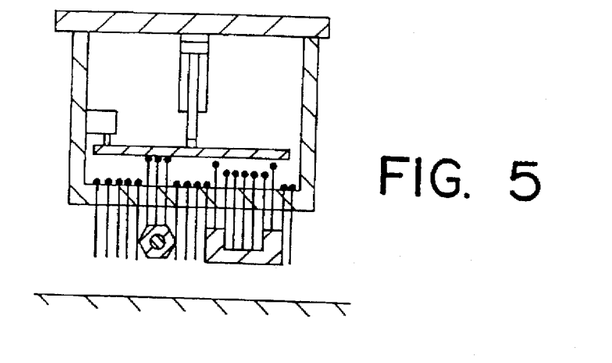
FIG. 5 shows the handling device according to FIG. 1, carrying the objects.

FIGS. 3 through 5 show the individual phases of movement of the handling device according to FIG. 1 as it picks up and deposits objects.

FIG. 3 shows the handling device above the objects 6 to be handled, prior to picking them up or after depositing them.

FIG. 4 shows the handling device lowered to the objects 6 to pick them up. The ejection plate 4 was pressed back by the holding pins 1, and the switch 7 is operated and emits a signal to lift the handling device. If the objects 6 are not grasped during lifting, the ejection plate is lowered again and the switch 7 remains unoperated.

This can be, for example, the signal for repeating or interrupting the gripping process in order to control the handling apparatus.

FIG. 5 shows the handling device with raised objects 6 in the travel position. Should the objects 6 be deposited after a completed movement, the ejection apparatus 5 is operated, the ejection plate 4 is moved downwardly and presses out the holding pins 1 and thus the objects 6, and the position of FIG. 3 is reached again.

Figure 6:
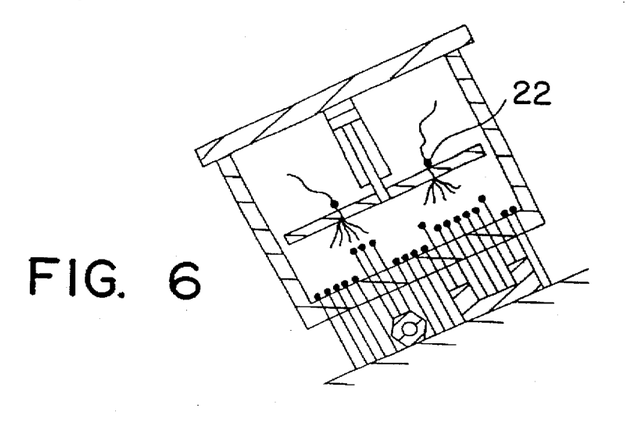
FIG. 6 is a side view of a modification of the handling device according to FIG. 1, with compressed-air nozzles.

FIG. 6 shows the handling apparatus according to FIG. 1 with additional compressed-air nozzles 22. The holding pins at the upper enlargements are acted upon by a brief compressed-air stream and pressed against the objects. This is particularly useful when the gravitational force of the holding pins is not sufficient for pressing against the objects. With this handling device, objects 6 can also be picked up from an inclined position, as shown, or even from a vertical plane.

Figure 7:
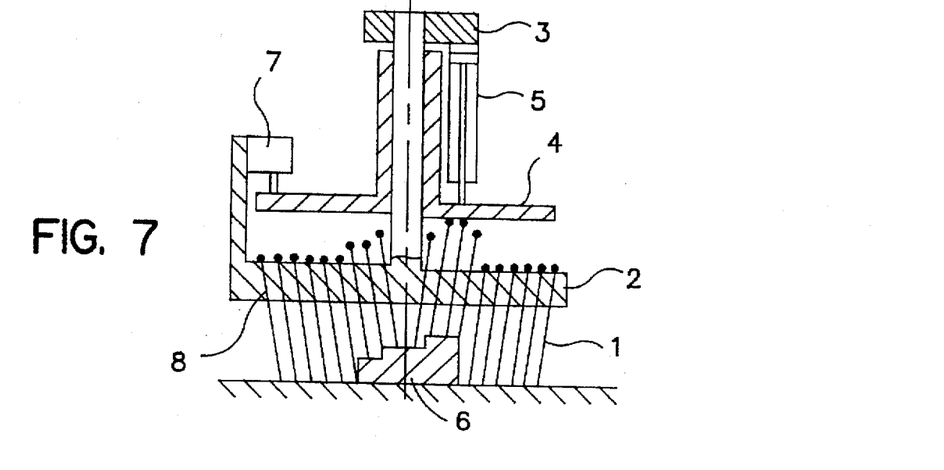
FIG. 7 is a side view (section) of a handling device with a round holding pin guide plate and V-shaped, concentrically-disposed holding pins, lowered to the objects in order to pick them up.

FIG. 7 shows another embodiment of a handling device. Also in this embodiment, the holding pin guide plate 2 is connected to the fastening plate 3. Again, holding pins are disposed to be longitudinally displaceable in a plurality of concentric, diagonal bores 8 in the holding pin guide plate 2.

Above the holding pins 1, the ejection plate 4 can be lowered to the holding pins by means of an ejection apparatus 5, not described in detail.

The operating principle of this embodiment of the device is identical to the one described for FIG. 1. Better clamping for some objects 6 can be achieved because of the diagonal position of the guide pins 1.

Figure 8:
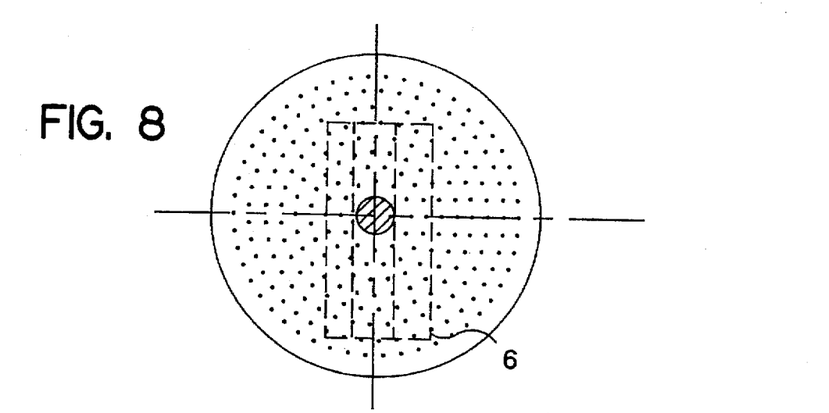
FIG. 8 is a top view (section) of the handling device according to FIG. 7.
Figure 9:
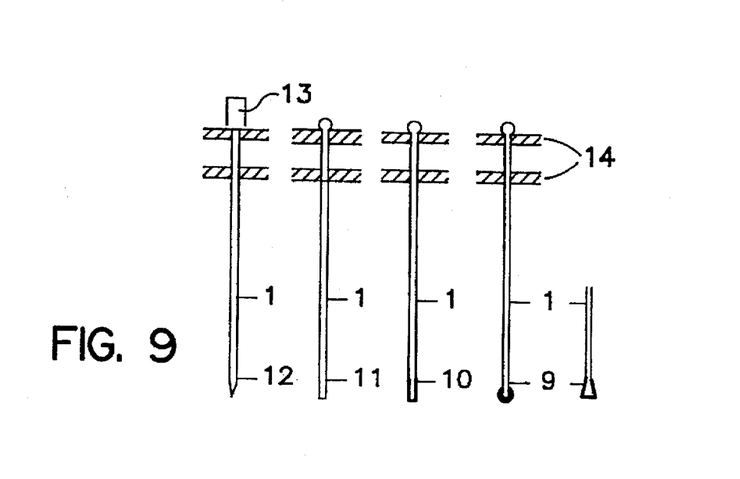
FIG. 9 is a side view of four differently-configured holding pins.

FIG. 8 shows a top view (section) of the handling device according to FIG. 7 with a work piece 6 to be handled. In FIG. 9, different embodiments of the holding pins 1 are shown, including points 12, a cylinder shape 11, friction lining 10 and shaped element 9 (such as a sphere, cone, and the like) at the lower end. The suitable holding pins 1 are selected depending on the objects to be handled. With the holding pins provided with shaped elements 9 and friction lining 10, the objects 6 are held, if need be, by means of positive lockup as well as frictional lockup. The enlargements 13 have the task of holding the holding pins 1 axially in one direction; at the same time, the clamping force of the holding pins on the objects is increased by the increase in the weight. The embodiment of a two-part holding pin guide plate 14 is also shown, in a parallel arrangement, in FIG. 9.

Figure 10:
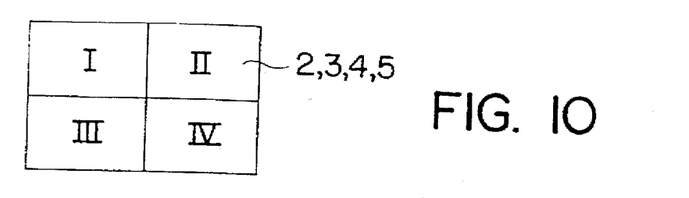
FIG. 10 is a top view of a four-part handling device system, comprising four individual devices, according to FIGS. 1 through 8.

FIG. 10 shows a top view of a four-part handling device system, comprising four handling devices I through IV according to FIGS. 1 through 8, for gripping objects 6 from different locations, simultaneously or offset temporally, and for selective simultaneous or temporally-offset deposit of the objects at one or a plurality of locations.

The individual handling devices I through IV can be configured parallel or slightly inclined toward one another in the system so that they can grasp one or more objects together. Moreover, they can comprise identical or different holding pins 1 or holding pin arrangements so that optimum grasping of the objects is achieved.

Hence, the travel paths can be shortened considerably, particularly in handling apparatuses, e.g. industrial robots, in this system because of the possibility of grasping and depositing different objects, individually or in groups, at any time.

Figure 11:
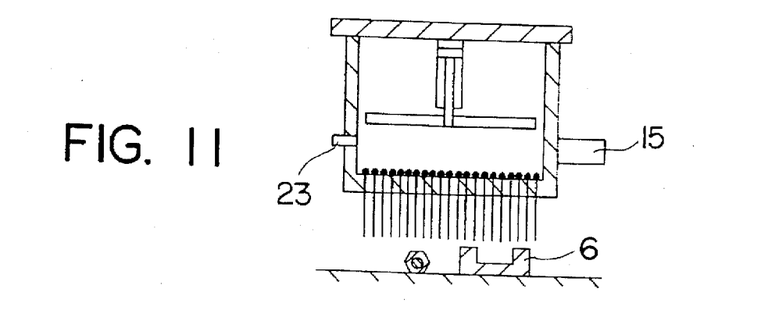
FIG. 11 shows the handling apparatus according to FIG. 1, additionally with a vibrator.

FIG. 11 shows a handling device according to FIG. 1 which is additionally equipped with a vibrator 15. In some objects 6, the clamping effect is increased through vibration.

Also shown is a light barrier 23, which emits a signal to the control of the handling apparatus as soon as the holding pins are longitudinally displaced relative to the holding pin guide plate by the objects, and their upper ends travel into the beam path.

Figure 12:
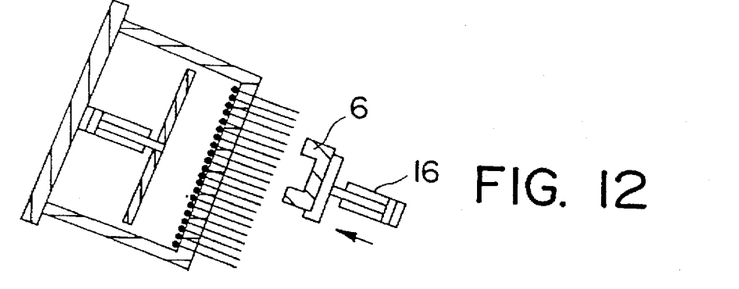
FIG. 12 shows the handling device, additionally with a feed-in apparatus.

FIG. 12 shows a handling device according to FIG. 1, in which the object to be gripped is inserted into the handling device by the feed-in apparatus 16. An object can also be inserted manually into the handling device.

Figure 13:
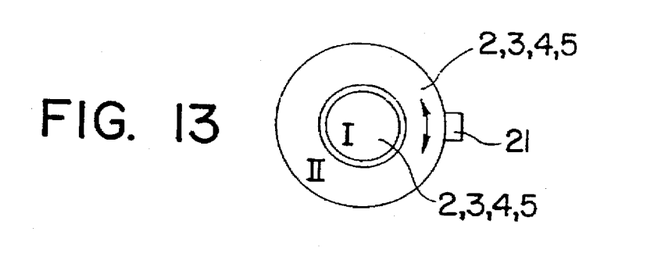
FIG. 13 is a top view of a two-part handling device comprising an outer annular device II and an inner core device I.

FIG. 13 shows a top view of a two-part handling device, similar to the one described in FIGS. 1 through 8, comprising an outer annular device II and an inner core device I.

Figure 14:
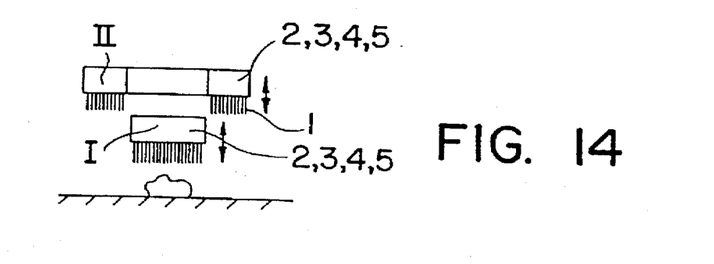
FIG. 14 is a side view of the two-part handling device according to FIG. 13.

FIG. 14 shows a side view of the two-part handling device according to FIG. 13; both devices I and II are seated to move axially, independently of one another, without interfering with each other. This combination of two or more handling devices has the advantage that, when only the core device I is activated, small objects are grasped, and larger or numerous objects are picked up during use of both devices I and II.

If the handling devices I and II according to FIG. 13 are seated to rotate independently counter to one another, and are accordingly not driven by the driving apparatus 21 not shown in detail, after the lowering of the handling devices to larger objects 6, whose outer contours are part of the two holding pin regions I and II, the objects can be additionally clamped by the holding pins 1 moving in opposite directions during rotation.

Figure 15:
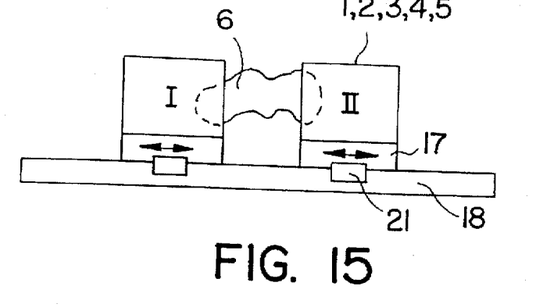
FIG. 15 is a top view of a two-part handling device with a carrying arm and movable sleds.

FIG. 15 shows a top view of a two-part handling device having a carrying arm 18, on which two sleds 17, each supporting a handling device according to FIGS. 1 through 8, are secured. The advantage of this two-part handling device is that, during gripping of larger objects 6, a holding pin arrangement is only required at certain contour elements of the outer contour for clamping. The sleds are driven by the driving apparatuses 21, and move the handling devices I and II into the corresponding positions.

This greatly reduces the number of necessary holding pins. Moreover, the inner or outer clamping of the objects 6 can also be increased by the movement of the sleds.

Figure 16:
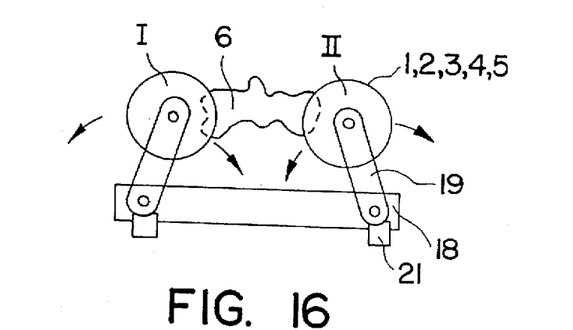
FIG. 16 is a top view of a two-part handling device with a carrying arm and pivot arms.

FIG. 16 shows a top view of a two-part handling device having a carrying arm 18, on which two pivot arms (19) that respectively support a handling device according to FIGS. 1 through 8 are secured. The advantage of this two-part handling device is in principle the same as described in connection with FIG. 15; the only difference is that the sleds 17 are replaced by pivot arms 19.

Figure 17:
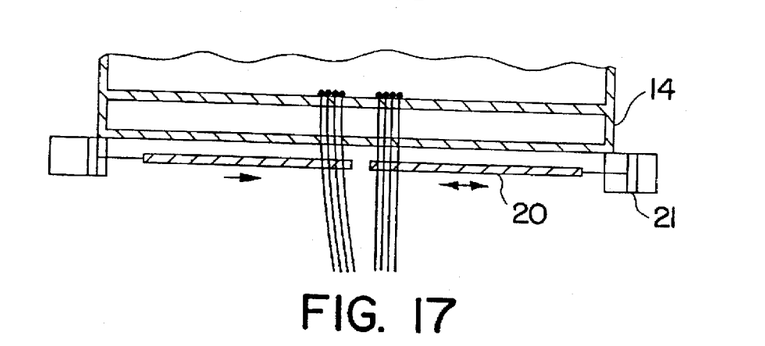
FIG. 17 shows the lower part of the handling device according to FIG. 1, additionally with two clamping plates disposed beneath the holding pin guide plate with two drive apparatuses.
Figure 18:
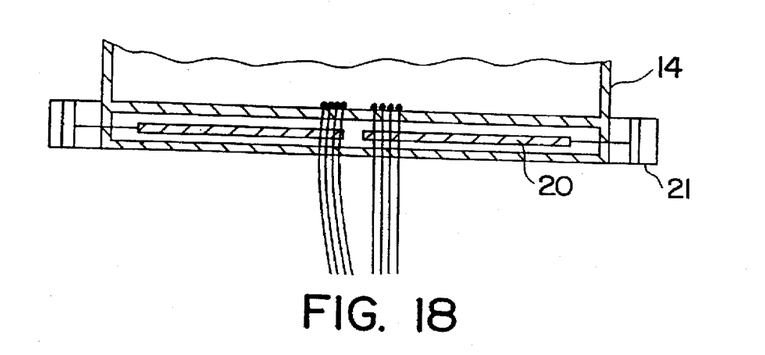
FIG. 18 shows the lower part of the handling device according to FIG. 1, additionally with two clamping plates disposed inside the holding pin guide plate with two drive apparatuses.

FIGS. 17 and 18 respectively show the lower part of the handling device according to FIG. 1, additionally equipped with two clamping plates (20) and two driving apparatuses 21.

In FIG. 17 the clamping plates 20 are disposed beneath the holding pin guide plate 14, and in FIG. 18 the clamping plates are disposed inside the holding pin guide plates 14.

The clamping plates 20, which are moved by driving apparatuses 21 not shown in detail, have the task of fixing the holding pins 1 axially by means of non-positive lockup once the pins have adapted to the surface of the objects 6 during the gripping movement. This is achieved through displacement of the clamping plates 20 relative to the holding pin guide plate arrangement 2, 14. The lower ends of the holding pins 20 are also moved by the bearing play in the holding pin guide plate arrangement 2, 14. If the force on the holding pins is increased by further movement of the clamping plates 20, the pins are elastically deformed, as can be seen on the left side of FIGS. 20 and 21. Because of this deformation, the lower ends of the holding pins 1 move, by means of which the gripping function can be intensified with non-positive and/or positive lockup.

Figure 19:
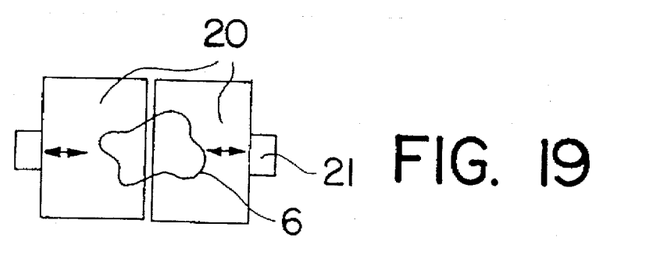
FIG. 19 is a top view of a clamping plate arrangement which includes two clamping plates.

FIG. 19 shows a top view of a clamping plate arrangement according to FIGS. 17 and 18, with two clamping plates 20 that are moved counter to one another by the driving apparatuses 21 not shown in detail. Because of this arrangement, the holding pins 1 are moved in the two zones, likewise counter to one another, for better clamping of the objects 6.

Figure 20:
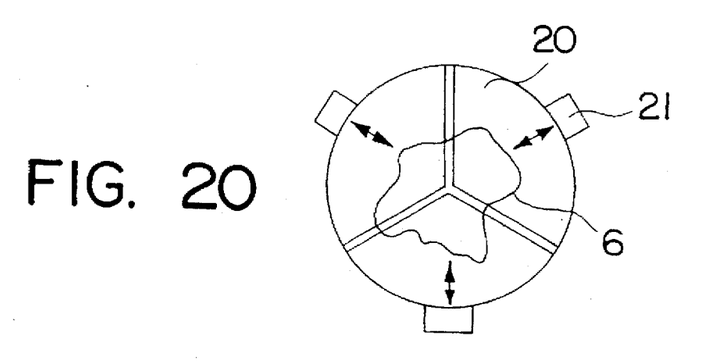
FIG. 20 is a top view of clamping plate arrangement which includes three clamping plates.

FIG. 20 shows a top view of a clamping plate arrangement according to FIGS. 17 and 18, with three clamping plates 20 that are moved radially by the driving apparatuses 21 not shown in detail. The holding pins 1 are also moved radially in the three zones for better clamping of the objects 6.

Figure 21:
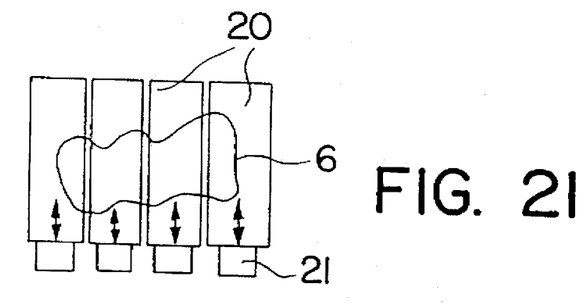
FIG. 21 is a top view of a clamping plate arrangement which includes four clamping plates.

FIG. 21 shows a top view of a clamping plate arrangement according to FIGS. 17 and 18, with four clamping plates 20 that are moved parallel to one another and respectively in opposite directions by the driving apparatuses 21 not shown in detail. The holding pins 1 are also moved parallel and in opposite directions in the four zones for better clamping of the objects 6.

Figure 22:
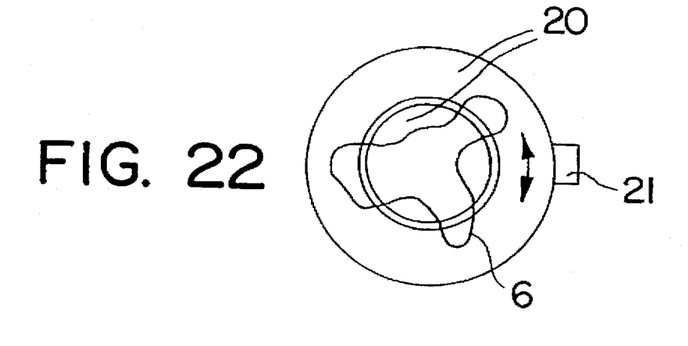
FIG. 22 is a top view of a clamping plate arrangement which includes two clamping plates that can be rotated relative to one another.

FIG. 22 shows a top view of a clamping plate arrangement according to FIGS. 17 and 18, with two clamping plates 20 that are moved angularly offset with respect to one another by the driving apparatuses 21 not shown in detail. The holding pins 1 are moved angularly offset with respect to one another in the two zones for better clamping of the objects 6.

Figure 23:
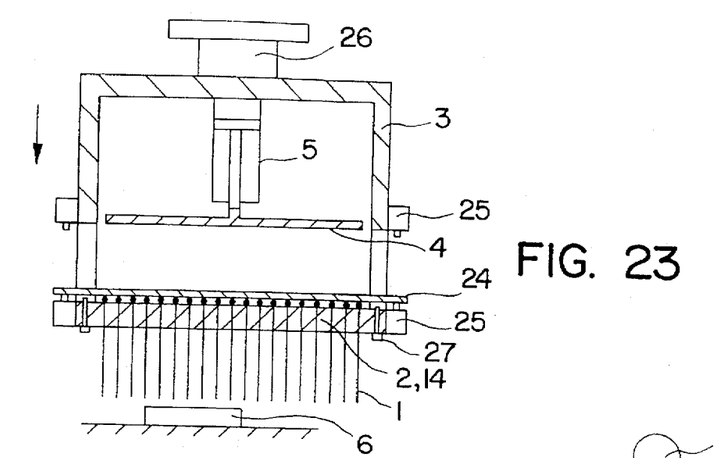
FIG. 23 shows the handling device according to FIG. 1, additionally equipped with a switching sensor plate, switching sensors, a force-measuring sensor with a fastening flange, and a plug connection.

FIG. 23 shows the handling device above an object 6, the device including a switching sensor plate 24 that lies on top of the holding pins 1. In this position the lower switching sensors 25 are operated, which signals the control of a handling apparatus that no object is grasped. If the handling device is moved toward the object 6, the holding pins are displaced upwardly with the switching sensor plate 24 until the upper, settable switching sensors 25 have been reached and the control of the handling device is thus signaled, depending on the path, that an object 6 is grasped. The switching sensor plate 24 and the holding pins 1 are brought into the illustrated initial position by the ejection plate 4 with the ejection apparatus 5, causing the object 6 to be ejected and deposited. The handling device also has a force-measuring sensor with a fastening flange 26, which permits force-dependent control of a handling apparatus, if needed, when the object 6 is picked up. The holding pin guide plates 2, 14 can easily be exchanged by way of the plug connection 27.

Figure 24:
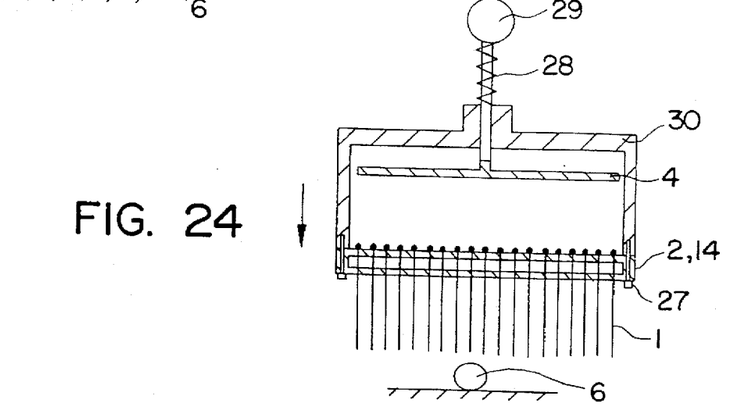
FIG. 24 shows the handling device for manual handling, with a manual ejector lever and housing with handle.

FIG. 24 shows a manually-operated handling device above an object 6. If the handling device is lowered to the object 6, the object 6 is clamped by the holding pins 1 and can be picked up. The grasped object 6 can be released and deposited by means of the manual ejection lever 29 with the ejection plate 4. Reference number 28 denotes a spring.

Figure 25:
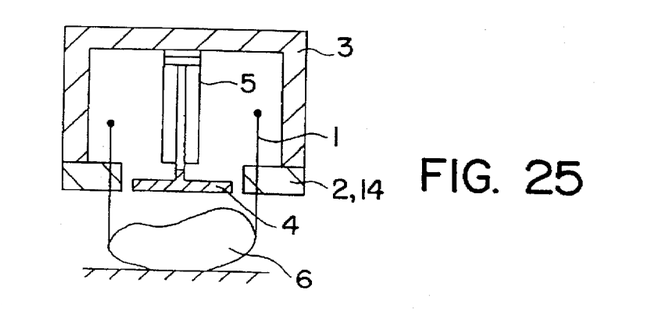
FIG. 25 shows the handling device with holding pins adapted to the objects and an ejection device.

FIG. 25 shows a handling device having only two holding pins 1, which are disposed in a favorable object-contour position, and which clamp and hold the object 6. The object 6 is released by the ejection plate 4 with ejection apparatus 5.

What is claimed is:

1. A handling device for mechanically gripping an object having contour regions, comprising:
   a fastening plate;
   a holding pin guide plate which is connected to the fastening plate and can be moved toward the object to be gripped in a lowering movement, the holding pin guide plate being provided with a plurality of bores disposed close together;
   holding pins which are guided to be axially displaceable in the bores, the holding pins projecting freely downwardly and having lower ends, the lower ends of some of the holding pins being tangential to the object and being engaged against the contour regions of the object by elastic deformation of the holding pins during the lowering movement of the holding pin guide plate to thus clamp the object;

an ejection plate; and an ejection apparatus disposed above the holding pin guide plate, to lower the ejection plate toward the holding pin guide plate.

2. A handling device according to claim 1, further comprising a switch for actuating a handling device, the switch being positioned for engagement by the ejection plate.

3. A handling device according to claim 1, wherein the holding pins are guided parallel and so as to be longitudinally displaceable in the bores of the holding pin guide plate, the bores being disposed in a pattern selected from the group consisting of rows, a spiral shape, and concentrically.

4. A handling device according to claim 1, wherein the lower ends of the holding pins are provided with a point.

5. A handling device according to claim 1, wherein the lower ends of the holding pins are provided with shaped elements.

6. A handling device according to claims 1, wherein the lower ends of the holding pins are provided with a friction lining.

7. A handling device according to claim 1, wherein the holding pins have upper ends projecting from the holding pin guide plate, the upper ends of the holding pins being provided with enlargements.

8. A handling device according to claim 1, in combination with another handling device which includes a holding pin guide plate and holding pins, the handling device and another handling device being joined to form a unit.

9. A handling device according to claim 1, wherein the holding pin guide plate is configured in two parts.

10. A handling device according to claim 1, further comprising vibrator means for vibrating the holding pins.

11. A handling device according to claim 1, wherein the object is inserted, in an arbitrary angular position between vertical and horizontal, into the holding pins for further handling.

12. A handling device according to claim 1, in combination with another handling device which includes a holding pin guide plate and holding pins, the handling device and the another handling device being joined to form a unit in which the holding pin guide plates of the handling device and the another handling device are concentric and can be axially displaced separately.

13. A handling device according to claim 1, in combination with another handling device which includes a holding pin guide plate and holding pins, the handling device and the another handling device being joined to form a unit in which the holding pin guide plates of the handling device and the another handling device are concentric and can be rotated counter to one another separately.

14. A handling device according to claim 1, in combination with a carrying arm, first means for mounting the holding pin guide plate of the handling device on the carrying arm, another handling device which includes a holding pin guide plate and holding pins, and second means for mounting the holding pin guide plate of the another handling device on the carrying arm, the second means including a sled to permit the another handling device to travel with respect to the carrying arm.

15. A handling device according to claim 1, in combination with a carrying arm, a pivot arm pivotably mounted on the carrying arm, the holding pin guide plate being secured to the pivot arm, another handling device which includes a holding pin guide plate and holding pins, and another pivot arm pivotably mounted on the carrying arm, the holding pin guide plate of the another handling device being secured to the another pivot arm.

16. A handling device according to claim 1, further comprising a clamping plate having bores through which the holding pins extend, the clamping plate being mounted for movement parallel to the holding pin guide plate.

17. A handling device according to claim 1, further comprising a clamping plate having bores through which the holding pins extend, the clamping plate being mounted for rotation relative to the holding pin guide plate.

18. A handling device according to claim 1, wherein the holding pins have upper ends, and further comprising means for emitting a signal as soon as the upper ends of said some of the holding pins enter a light beam path that is located above the holding pin guide plate.

19. A handling device according to claim 1, further comprising a switching sensor plate which lies loosely on top of the holding pins, a settable upper switching sensor mounted above the switching sensor plate, and a settable lower switching sensor mounted below the switching sensor plate, the switching sensor plate being moved by said some of the holding pins between the settable upper and lower switching sensors.

20. A handling device according to claim 1, further comprising a force sensor having a fastening flange, the force sensor being disposed above the handling device.

21. A handling device according to claim 1, wherein the holding pin guide plate is configured to be easily exchanged via a plug connection.

22. A handling device according to claim 1, wherein only a few holding pins are disposed at positions selected to permit engagement with the contour regions of the object, and the ejection plate directly ejects the object.

23. A handling device according to claim 1, further comprising a housing to which the holding pin guide plate is connected, and wherein the ejection apparatus comprises a manually operable handle, and an ejection lever which connects the handle with the ejection plate and which slidably extends through an aperture in the housing.

24. A handling device according to claim 1, wherein the holding pins have a cross-sectional shape selected from the group consisting of round and polygonal.

25. A handling device according to claim 1, wherein the lower ends of said some of the holding pins are frictionally engaged against the contour regions of the object.

26. A handling device according to claim 1, wherein the holding pins are configured so that the lower ends of said some of the holding pins are engaged against the contour regions of the object in a position lockup.

27. A handling device for mechanically gripping an object resting on a support, the object having a bottom side which faces the support, a top side which faces away from the support, and a periphery with contour regions between the top and bottom sides, said handling device comprising:

a holding pin guide plate having a plurality of bores; and elastically deformable holding pins which slidably extend through the bores, the holding pins having top ends, bottom ends, and sides between the top and bottom ends, wherein the top side of the object engages the bottom ends of a first subset of the holding pins when the holding pin guide plate is lowered toward the object, so that the top ends of the first subset of holding pins are pushed away from the holding pin guide plate by the object, and wherein the contour regions of the object elastically deform a second subset of the holding pins when the holding pin guide plate is lowered toward the object, with the sides of the holding pins of the second subset being pressed against the object.

28. A handling device according to claim 27, wherein the second subset of holding pins surrounds the first subset, and wherein a third subset of the holding pins is peripheral to the second subset, the holding pins of the third subset missing the object when the holding pin guide plate is lowered toward the object.

29. A holding pin guide plate according to claim 27, further comprising an ejection plate disposed above the top ends of the holding pins, and ejection means for moving the ejection plate toward the holding pin guide plate.

30. A holding pin guide plate according to claim 27, further comprising sensor means for sensing when the top ends of at least some of the first subset of holding pins have been pushed away from the holding pin guide plate by a predetermined distance.

31. A holding pin guide plate according to claim 27, wherein the bottom ends of the holding pins have enlarged portions.

* * * * *